Sept. 23, 1941. C. G. BROSTROM 2,256,546
ROUGHING MACHINE
Filed Dec. 16, 1939 2 Sheets-Sheet 1

INVENTOR
Charles G. Brostrom
By his attorney

Sept. 23, 1941.  C. G. BROSTROM  2,256,546
ROUGHING MACHINE
Filed Dec. 16, 1939  2 Sheets-Sheet 2

Patented Sept. 23, 1941

2,256,546

UNITED STATES PATENT OFFICE 2,256,546

ROUGHING MACHINE

Charles G. Brostrom, Salem, Mass., assignor to United Shoe Machinery Corporation, Borough of Flemington, N. J., a corporation of New Jersey Application December 16, 1939, Serial No. 309,604

5 Claims. (Cl. 69—1)

This invention relates to roughing machines and is herein illustrated and described as embodied in a machine for roughing the overlasted margin of the upper of a lasted shoe, although the useful application of the invention is not limited to upper roughing but may include sole roughing as well.

It is a primary object of the invention to provide an improved machine which will effectively rough shoe leather in a uniform and desirable manner to prepare it for the reception of cement.

An important feature of the invention consists in the combination, with a tool carrier supported for rotation about a primary axis, of a roughing tool journaled for rotation in said carrier about a secondary axis perpendicular to said primary axis, and means simultaneously rotating the carrier and the tool about the two axes respectively. The effect of the combined rotary and turning movements of the roughing tool is to pick up the fibers of the leather and stir them thoroughly, producing a uniform velvety surface which is ideal for the reception of sole-attaching cement.

In order to secure the maximum benefit from this compound tool action the roughing tool may comprise a pair of roughing members which are caused to rotate in opposite directions about the above mentioned secondary axis and another feature of the invention consists in the provision of means for simultaneously rotating the said roughing members in opposite directions about the secondary axis while the entire tool is being rotated about the primary axis.

In the illustrated machine there is a power-driven rotary housing in which is clamped a tool carrier, the roughing tool being journaled for rotation in the carrier about an axis perpendicular to the axis of rotation of the housing and the tool being rotated by power derived from the rotating housing through planetary gearing which includes a stationary sun gear concentric with the axis of rotation of the housing.

A further feature of the invention resides in the combination, with the roughing tool, of a swinging gage adapted to contact with the side of the shoe being operated upon and treadle operated means for supporting the gage and swinging it outward and away from the tool and the side of the shoe. This structural combination greatly facilitates accurate guiding of the shoe past the roughing tool, particularly in the shank portion of the shoe where there is no edge or corner to define the junction line between the shoe bottom and the side of the shoe.

The above and other features of the invention and benefits derived from the use thereof will be better understood and appreciated from reading the following detailed description of the illustrated machine in connection with the accompanying drawings in which Fig. 1 is a vertical section of the machine from front to rear;

Figure 1:
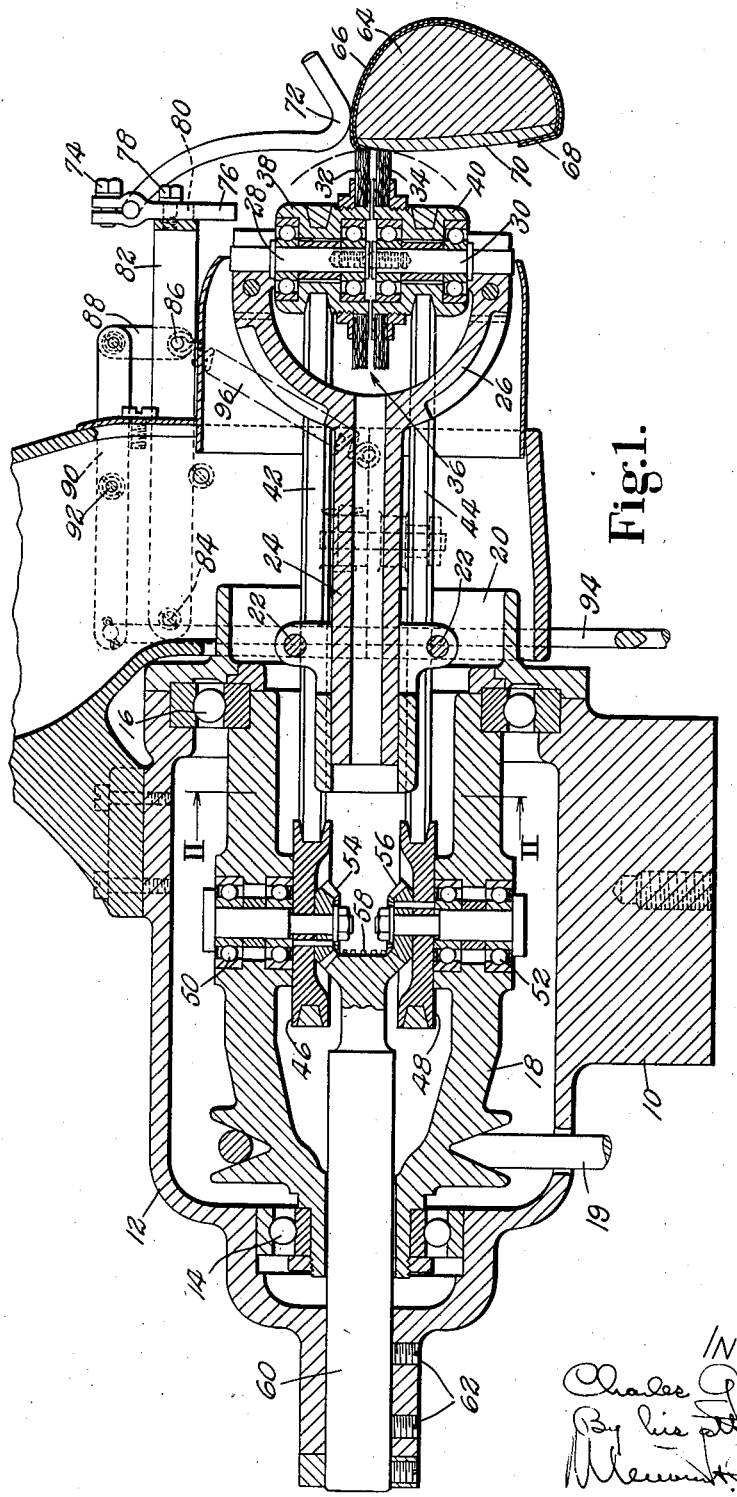
Figure 2:
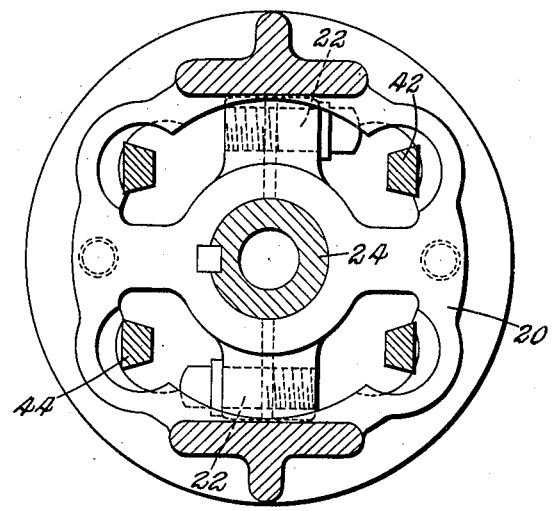
Fig. 2 is a cross section on the line II—II of Fig. 1.

Referring to the drawings, 10 indicates a base adapted to be supported upon a bench or upon a column arising from the floor. Formed integrally with the base 10 is a casing 12 containing ball bearings 14, 16 in which is journaled a horizontal, rotary housing 18 driven by a belt 19 from any suitable source of power. Affixed to the housing 18 is a spider 20 in which is secured, by clamping screws 22, the stem 24 of a tool carrier 26 in such a position that the stem of the tool carrier is co-axial with the horizontal axis of rotation of the housing 18.

The tool carrier 26 is yoke-shaped and two alined studs 28, 30 are secured in the end portions of the arms of the yoke. Each of these studs carries ball bearings upon which are journaled, closely adjacent to each other, the two members 32 and 34 of a circular roughing tool which is designated in its entirety by 36. The axis of the studs 28, 30 is, therefore, the axis of the roughing tool and this axis intersects the axis of rotation of the housing 18 and the tool carrier 26 at right angles so that the axis of the housing coincides with the diameter of the tool.

Each of the tool members 32, 34 has a pulley 38, 40 affixed thereto and these pulleys are connected, respectively, by belts 42, 44 to pulleys 46, 48 which are rotatable in ball bearings 50, 52 mounted in the housing 18, the axis of these bearings being parallel to the axis of the roughing tool. Affixed to the pulleys 46, 48 are bevel pinions 54, 56 which are in mesh with a stationary bevel sun gear 58 formed upon the end of a cylindrical stud 60 held by set screws 62 in the casing 12 in such a position that the gear 58 is within the housing. The axis of the sun gear coincides with the axis of rotation of the housing 18 and rotation of said housing causes the pinions 54, 56 to roll around the sun gear 58 and rotate the pulleys 46, 48 simultaneously in opposite directions. Consequently, when the housing 18 is rotated at a constant speed about its own axis, the roughing tool 36 is not only rotated at a constant speed about that axis but the two members 32, 34 of the tool are additionally rotated at constant speeds in opposite directions about a whirling axis at right angles to the axis of the housing.

For the purpose of permitting adjustment of the tension of the belts 42, 44 the clamp screws 22 may be loosened to allow the stem 24 of the tool carrier to be moved in or out until the correct belt tension is obtained, whereupon the screws 22 may be tightened to preserve the adjustment.

Figure 3:
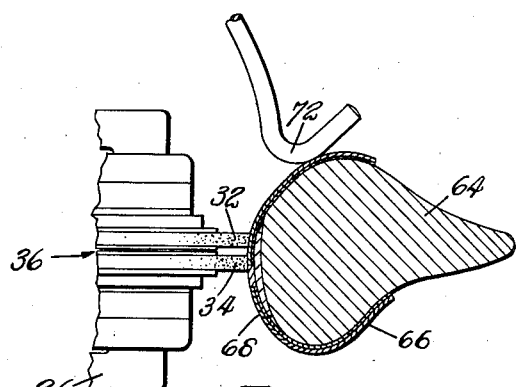
Fig. 3 is a detail view in side elevation illustrating the relation between the roughing tool, the shoe and the gage.

In Figs. 1 and 3, 64 indicates a last upon which is mounted a shoe upper 66 the margin 68 of which is lasted over upon an insole 70. In order to facilitate the accurate presentation of the overlasted margin 68 to the whirling and rotating tool 36, there is provided a curved gage 72 which is arranged to guide the shoe by engagement with the side of the shoe upper 66. The gage 72 is adjustably secured by a clamping screw 74 in the split end of a holder 76 which is, in turn, adjustably attached by a screw 78, passing through a slot 80 in the holder 76, to one end of a bar 82 the other end of which is movable about a fixed pivot 84 at one side of and above the roughing tool 36. Connected to an intermediate point 86 upon the bar 82 by means of a link 88 is one end of a lever 90 which is movable about a stationary pivot 92. The other end of the lever 90 is connected by a treadle rod 92 to a treadle, not shown. A yieldable spring 96, attached to a stationary point and, at the point 86, to the bar 82, tends at all times to lower the gage 72 and depression of the treadle rod 94 causes the gage to be raised against the tension of the spring.

The adjustments provided by the screws 74 and 78 permit the gage 72 to be located in the proper position for correct action of the roughing tool upon the overlasted margin of the shoe upper around the forepart of the shoe, where the cross sectional shape of the last is approximately as illustrated in Fig. 1. The shoe is manually presented to the roughing tool and moved along against the gage until the shank portion of the shoe is reached, whereupon the treadle is depressed to move the gage upward and outward, away from the tool. Fig. 3 illustrates the condition in the shank portion of the shoe, where the last has a cross sectional shape approximately as illustrated in Fig. 3. When working upon this part of the shoe the gage 72, if it were in the position shown in Fig. 1, would obviously interfere with the proper presentation of the shoe to the roughing tool but when the gage is moved to the position shown in Fig. 3 it still serves so to guide the shoe that the shoe bottom is presented properly to the tool and the treadle control makes it easy to move the gage to the position where it will be in correct relation to the tool regardless of the shape of the particular portion of the shoe being operated upon.

Having described the invention, what is claimed as new and desired to be secured by Letters Patent is:

1. In a roughing machine, the combination of a power driven rotary housing, a tool carrier secured in the housing, a roughing tool journaled for rotation in the carrier about an axis perpendicular to the axis of rotation of the housing, a stationary gear concentric with the housing, a pinion meshed with said stationary gear and journaled for rotation in the housing, and power transmitting connections between the pinion and the roughing tool.

2. In a roughing machine, the combination of a power driven rotary housing, a tool carrier secured in the housing, a roughing tool comprising a pair of roughing members journaled for rotation in the carrier about an axis perpendicular to the axis of rotation of the housing, a stationary gear concentric with the housing, a pair of pinions meshed with said stationary gear and journaled in the housing for rotation about an axis parallel to the axis of the roughing tool, pulleys affixed to the pinions and the roughing members, and belts connecting the pinion pulleys to the roughing member pulleys respectively.

3. In a roughing machine, the combination of a tool carrier, a roughing tool journaled to rotate in said carrier, and mechanism for rotating said tool, said mechanism including power driven planetary gearing and a driving belt connecting the planetary gearing to the tool.

4. In a roughing machine, a circular, rotary, roughing tool, means for rotating the tool at a constant speed about an axis coinciding with its diameter, and means for rotating said tool at a constant speed about an axis passing through its center and perpendicular to its plane.

5. In a machine for roughing the bottom of a lasted shoe, a power driven housing journaled to rotate about a horizontal axis, a spider affixed to the housing, a tool carrier clamped in the spider, a roughing tool journaled for rotation in the carrier, a stationary stud co-axial with and extending into the housing, a stationary gear on the stud within the housing, a pinion journaled in the housing and in mesh with the stationary gear, and power transmitting connections between the pinion and the roughing tool.

CHARLES G. BROSTROM.